Feb. 2, 1954
D. E. HOOKER ET AL
2,668,230
MODULATED LIGHT PROJECTOR WITH SCRAMBLING DRIVE
Filed May 28, 1948
4 Sheets-Sheet 1
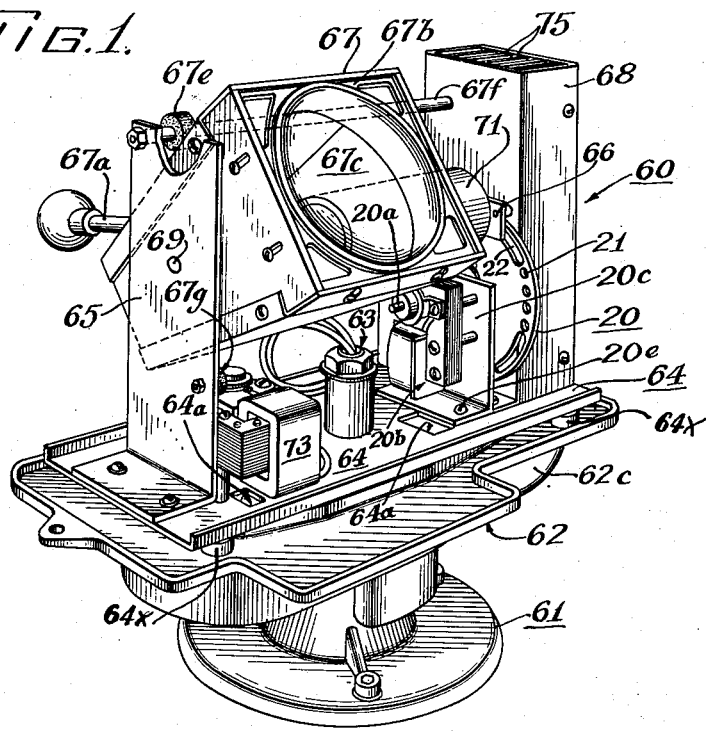
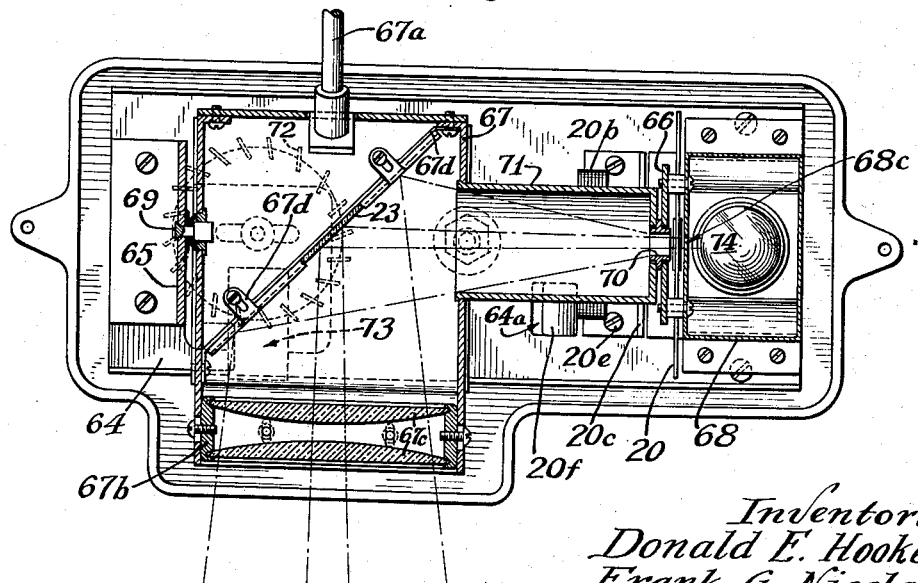
Inventors:
Donald E. Hooker
Frank G. Nicolaus
By
Attorney Feb. 2, 1954 D. E. HOOKER ET AL 2,668,230
MODULATED LIGHT PROJECTOR WITH SCRAMBLING DRIVE
Filed May 28, 1948 4 Sheets-Sheet 2

Inventors:
Donald E. Hooker
Frank G. Nicolaus
By
Attorney

Feb. 2, 1954            D. E. HOOKER ET AL            2,668,230
MODULATED LIGHT PROJECTOR WITH SCRAMBLING DRIVE
Filed May 28, 1948                                                   4 Sheets-Sheet 3
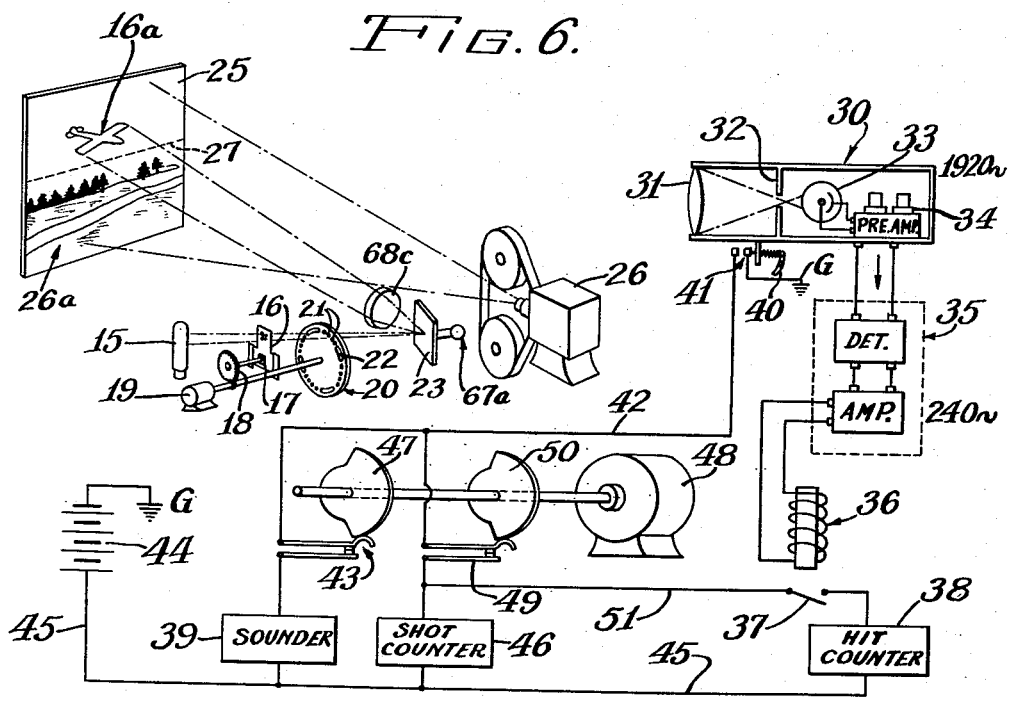
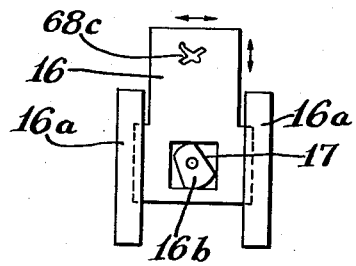
Inventors:
Donald E. Hooker
Frank G. Nicolaus
By                Attorney Feb. 2, 1954  D. E. HOOKER ET AL  2,668,230
MODULATED LIGHT PROJECTOR WITH SCRAMBLING DRIVE
Filed May 28, 1948  4 Sheets-Sheet 4

Inventors:
Donald E. Hooker
Frank G. Nicolaus
By
Attorney

Patented Feb. 2, 1954

2,668,230

UNITED STATES PATENT OFFICE 2,668,230

MODULATED LIGHT PROJECTOR WITH SCRAMBLING DRIVE

Donald E. Hooker, Skokie, and Frank G. Nicolaus, Chicago, Ill., assignors to Raymond T. Moloney, Chicago, Ill.

Application May 28, 1948, Serial No. 29,876

12 Claims. (Cl. 240—48)

This invention relates to photoelectric apparatus and the use of modulated light in conjunction with selective photoelectric circuits, and controlled means operated thereby responsive to the discriminative operation of the photoelectric circuit when actuated by appropriately modulated light.

The important objects of the invention pertain to the provision of a projector of modulated light in the nature of a compact unit which includes a light source, modulating means, manually and automatically operable means for directing the light pattern at will or in accordance with a variable or scrambled pattern, and circuit connections and controls appurtenant thereto.

A previous, copending application, Serial No. 378,645, filed February 12, 1941 by Donald E. Hooker, now Patent No. 2,516,319, discloses photoelectric marksmanship apparatus utilizing a form of modulated light as part of a discriminative system.

The present application pertains to apparatus useful in conjunction with the disclosures of U. S. Patent No. 2,442,240 to Donald E. Hooker et al.

In its more detailed aspects, the instant application is directed to details of the construction and operation of the light projecting unit and means, and control circuits therefor, including particularly a rockable housing for a reflector and lens system, a hollow rocking axis member for the housing, a light source aligned with the hollow axis, modulating means affecting the light through the hollow axis, together with pivotal mountings and manipulating appurtenances by which the housing may be directed to throw the modulated light variously on a wall, screen, or other surface to cause a marksman to exercise skill in following and taking aim at the target defined by such modulated light.

Additional details of novelty in the invention relate to the control circuits for automatically meandering the light beam through a plurality of motor drives for moving the housing with respect to several pivotal or turning axes, for varying in uncertain manner the rate of movement with respect to either turning axis, for reversing such movement at irregular times, and for scrambling in indefinite pattern the changes in rate and direction of the aforesaid projector movements.

Further objects, advantages, and aspects of novelty and utility in the devices and methods hereinafter disclosed, pertain to structural and functional details of the commercial embodiment of the marksmanship training and testing apparatus described hereinafter in view of the annexed drawings in which:

Fig. 1 is a perspective of the projector unit with the cover removed;

Fig. 2 is a horizontal section through the horizontal axis of the projecting unit of Fig. 1;

Fig. 6 is a schematic diagram of a modified form of projective arrangement and circuit connections for the photoelectric gun and score counting means;

Fig. 7 is an elevational view of a variator for the image forming means;

Figure 3:
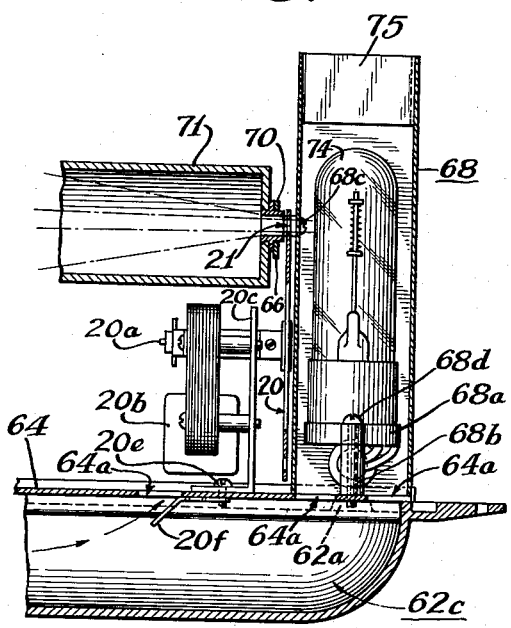
Fig. 3 is a vertical sectional fragment of the lamp housing shown in Fig. 2.

In its more general aspects, the invention is best explained by reference first to the schematic showing of Fig. 6 herein, in which there is shown a light source 15 which projects light through an image forming device 16 adapted to be moved by a cam arrangement 17 (see Fig. 7 also) driven through a train of gears 18 by a motor 19. In the present instance, the image forming device 16 is designed to define the image of an airplane, which image is adapted to be projected on a reflecting surface, such as the screen 25 or a wall surface or the like, the light rays which define such image being reflected from a dirigible reflecting device or mirror 23.

Figure 8:
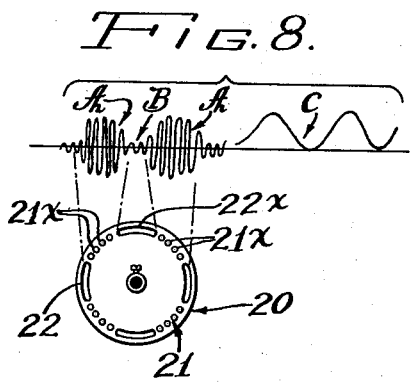
Fig. 8 is a graphical representation of the wave form of the amplified and rectified signals in the photoelectric circuit, representative of the double-modulated light tuning means of the invention.

The image-forming rays from source 15 are modulated or "keyed" by a special form of interrupter disc 20, which (see also Fig. 8) includes a group of serial holes 21, in this instance four in number, alternating with elongated slots 22 adapted to provide a peculiar modulation, which for present purposes may be referred to as double modulation, and which is most conveniently interpreted in terms of the resultant amplified signal or amplified photoelectric-impulse wave forms shown in Fig. 8, wherein the wave form or component A represents the first or principal modulation (after amplification) effected upon the light which is permitted to pass by any given group of small holes 21, while the smaller wave component B represents the second modulation due to the slots 22, with an obviously lesser frequency amplitude than those caused by the series of holes.

Regarded in another aspect, the wave components A and B may also be considered to represent the output signal of the photoelectric device after amplification by amplifier 34, or conversely the input signal as received by the detector or rectifier, while the third wave form C in Fig. 8 represents the rectified signal of predetermined frequency delivered at the output of the main amplifier for purposes of operating a score control device or the like.

For present purposes, it is sufficient to state that the disc 20 is rotated at a speed correlated to the size and spacing of the modulating or light-keying formations, that is the holes and slots, which will cause the light beam to be interrupted at a principal frequency of 1920 times per second (by holes 21), and at a secondary or superimposed frequency of 240 times per second (by slots 22). The peculiar advantages flowing from this arrangement will be discussed hereinafter.

Referring again to Fig. 6, there is additionally provided a background projecting means such as a moving picture projector 26 adapted to project suitable background scenery 26a onto the screen 25 as indicated below the dotted line 27, the image 16a of the airplane being indicated above the dotted line. The image may be moved about at will over the background images without interference from the latter.

The arrangement further includes an aiming device or gun 30 preferably provided with an objective lens 31 adapted to collect the target image rays from screen 25 for passage through an aperture plate 32 and onto a photoelectric cell 33 connected with a pre-amplifier 34 which is housed in the gun 30 and which is peaked or tuned to 1920 cycles. The pre-amplifier has its output connected to a main detector-amplifier unit 35, including a detector or rectifier DET., and an amplifier AMP., which is discriminative for maximum output at about 240 cycles per second.

The amplifier output is connected to a controlled instrumentality, such as the hit relay 36, which in turn controls through its switch 37 an electrically operated hit or score counter 38 of known construction.

In order to provide a realistic effect, an electrically operated shot sounder 39 of known construction is connected for operation from a power supply or battery 44 under control of a fire switch or trigger 40 which completes a power circuit to the shot sounder from a common or ground connection G through contacts 41, conductor 42 and interrupter cam switch 43 to the sounder 39, and via conductor 45 to battery 44.

An interrupter motor 48 drives a cam 47 to effect opening and closing of switch 43 at a desired "firing" rate of 850 times per minute, while another cam 50 opens and closes a supervisory switch 49 at the same rate to intermittently connect both the shot counter 46 and hit counter 38 (through hit relay switch 37) with the power source or battery 44 via conductors 51 and 45.

As a result of the foregoing arrangement, it will appear that it is necessary that trigger switch 40—41 be closed in order to condition the hit and shot counters for operation and to actuate the sound-effect device 39, and that these control circuits are interrupted at a rate of 850 times per minute by the interrupter cam switches.

If the gun 30 were properly trained upon the luminous target image 16a for the duration of a minute, a perfect score would be registered, indicating 850 shots on the shot counter 46 and 850 hits on the hit counter 38. When the target is moving, of course, the marksman's skill in keeping the weapon trained during the intervals when the trigger is pulled, is measured by a comparison of the readings of the hit counter 38 and the shot counter 46.

By modulating the light employed to define a target image such as the image of the airplane 16a, Fig. 6, and by tuning the amplifiers 34 and 35, or either of them, to the frequency of the modulation, the system is rendered highly selective, so that it is not only possible to use the device in the presence of extraneous modulated light, such as that supplied by incandescent lamps from the usual alternating current mains (ordinarily interrupted 120 times per second) but in addition it is possible to deliberately project variably modulated light, as by the motion picture projector 26, with such a high degree of selectivity in the pick-up device 30 and the associated amplifying means, that the light fluctuations caused by the motion picture projector 26 or analogous device, in no way interfere with the proper operation of the photoelectric means even though they may contain random component frequencies of the modulation frequencies. Thus false indications of a hit by the counting device 38 are obviated, and the adaptability of the system as a whole is vastly extended.

In accordance with the present invention both the selectivity and the sensitivity of the photo-electric system have been greatly increased by contriving a certain kind of modulation, which for purposes of present disclosure, is referred to as double modulation. This is conveniently explained by reference to Fig. 8 wherein there is shown one of the modulating discs 20, and immediately thereabove a graphical representation of the approximate variations in projected light (and hence in the electrical impulses or signals resultantly stimulated thereby in the photoelectric means 33—34).

It will be further observed from Fig. 8 that dotted-line projections have been extended from the uppermost elongated slot 22x to the small-amplitude wave lines indicated at B thereabove, while dotted lines extend from the two flanking groups of holes 21x upwardly to the corresponding high-amplitude portions A of the wave representation.

In the foregoing illustration, it will be appreciated that during that portion of the rotation of the modulating disc 20 when the holes 21x are passing before the projecting aperture, the projected light will be interrupted rapidly with relatively small amounts of light passing through as each of the small holes cuts across the light path, but when the relatively open elongated slots 22x cut across the light path, a considerably larger amount of light is permitted to pass and the frequency of interruption drops as shown graphically by the component B of the wave-form representations. The resultant rectified impulse which leaves the main amplifier unit 35 to operate the controlled instrumentality or hit counter relay 36, has the wave form represented at C of Fig. 8, which form is particularly effective for its intended purpose, and is made possible by the original double modulation A—B resulting from special modulating formations 21—22.

In other terms, the dual modulation increases the discriminative action of the device since the pick-up can be tuned to both modulating frequencies; for example, the pre-amplifier 34 in this case is tuned preferably to 1920 cycles, while the second main amplifier, AMP., following the detector, DET., may be inexpensively "tuned" to the frequency of the rectified or detected impulses—in this case, preferably 240 cycles.

Since the methods of tuning such amplifier circuits are well known in the art and do not constitute per se the invention herein, the specific circuits are not described in detail.

Figure 4:
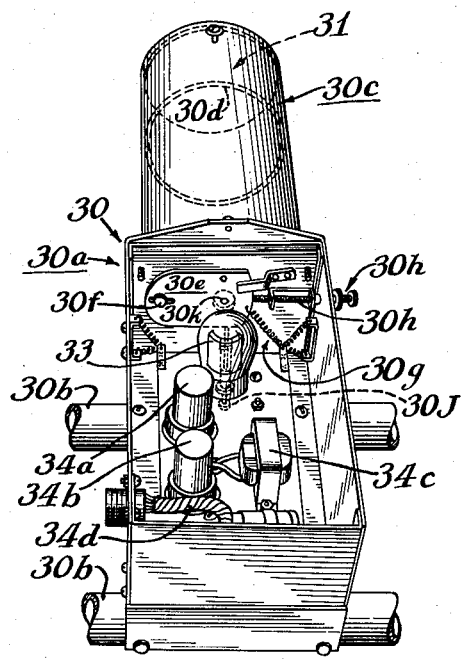
Fig. 4 is a perspective view of the pick-up or light gun with the cover removed and portions of the mounting brackets broken away.

The pick-up or gun 30 is shown in detail in Fig. 4, and includes a box-like housing 30a mounted on support bars 30b, and provided with a barrel portion 30c in the front end of which is a telescoping lens mount 30d carrying a collecting lens 31.

A light spot focusing plate 30e is slidably and rockably mounted by means 30f to the rear of the barrel in front of the photo cell 33, and the plate is pulled toward the right by a spring 30g against an azimuth adjusting set screw 30h, and also downwardly against a zenith adjusting set screw, 30j (dotted lines), by means of both of which the light aperture 30k in the plate may be adjusted with respect to the photo cell 33.

Figure 5:
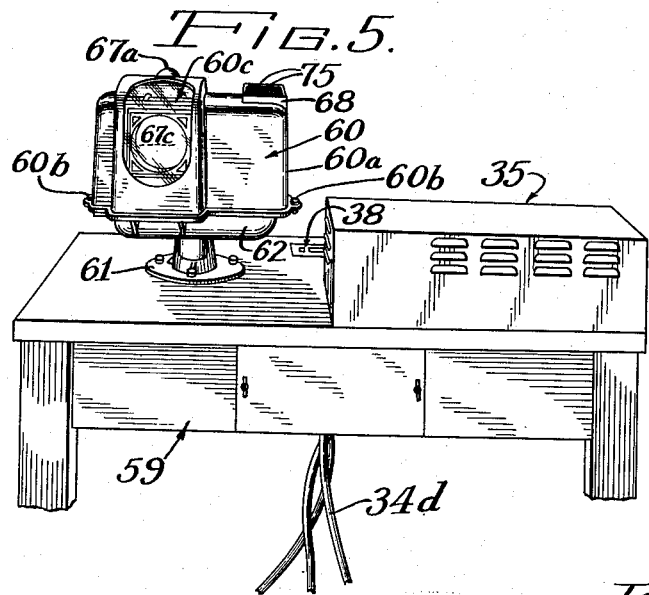
Fig. 5 is a perspective of the projecting table with lower portions of the legs cut away, showing the projector and amplifier units mounted thereon.

Pre-amplifier elements or tubes 34a and 34b, and tuning choke 34c are also situated within the gun housing and adapted to be connected with the main amplifier unit 35 by a cable lead 34d leading to the control table 59, shown in Fig. 5 upon which the projector unit 60 and main amplifier unit 35 are mounted. The gun housing 30a is normally closed by a cover (not shown).

The projector

As viewed in Figure 1, the projector consists of a base 61, upon which is mounted a hollow turret plate casting 62 to swivel about a hollow shaft 63. Upon a bed plate 64 is mounted an upright bracket 65 constituting one of a pair of trunnion members for a rockable lens and projection housing 67, the other trunnion member being a small plate 66 mounted (see also Fig. 2) on the side wall of a lamp housing 68. Plate 64 constitutes a cover for recessed parts 62C, but is spaced from the top of the turret casting by washers 64X to provide for flow of air relative to the hollow parts of the base structure.

At one (left) side the lens housing pivots on a pin 69 in bracket 65, while at its opposite side it pivots upon a bushing 70 (Fig. 2) seated in plate 66 and fixed in the end of a tubular extension 71 secured to the lens housing in alignment with its rocking axis. (See also Fig. 3.)

Referring to Fig. 3, the lamp well or housing 68 is seated on the bed plate 64, and includes a lamp socket 68a mounted on posts 68b by screws 68d threaded into bosses 62a on the turret plate just above a hollow air-flow passage 62c formed in the turret plate. Air passages 64a are provided in the bed plate for air driven by a fan 72 driven by small motor 73 (dotted lines Fig. 2), so as to cool a powerful electric lamp 74. The top of the lamp housing is open and provided with cooling louvres 75 (Figs. 1 and 3).

A handle 67a projects from the rear of the lens housing for manipulation by the instructor.

At the front of the housing is a cast lens mount or frame 67b (Fig. 2) in which are mounted a pair of condensing lenses 67c in alignment with a reflecting mirror 23 secured by brackets 67d across the interior of the lens housing in the path of light from lamp 74 passing through an aperture 68c in the lamp housing, so as to redirect the light at right angles to its original path of projection from the lamp housing. A rubber buffer or stop collar 67e is mounted on a tie rod 67f joining bracket 65 and housing 68 to cushion upward or zenith movements of the projector housing, while another stop 67g on post 65 stops downward motion thereof.

A very important feature of the invention is the modulating disc 20, which is fast on the shaft 20a of a small synchronous motor 20b secured to a mounting plate 20c fastened as at 20e to the bed plate. A baffle 20f serves to direct air from the hollow turret plate through one of the openings 64a to cool this motor. The small holes 21 and slots 22 of the modulating disc pass in optical alignment with the aperture 68c in the lamp housing, and bushing 70, so as to interrupt the light to be reflected from mirror 23 as heretofore described.

As viewed in Fig. 5, the projector is provided with a cover or hood 60a fastened onto the turret plate as at 60b, and includes an arcuate window 60c before which the lens housing can rock.

The form of projector just described is rocked up and down and sidewise by manipulation of handle 67a by the instructor, who is positioned before the table 59, while the marksman manipulates the gun 30 and endeavors to follow the target image of light as it is cast about the walls or onto a screen 25 by the instructor. If desired, the aperture 68c of Fig. 3 may be shaped to define the outline of an aeroplane, tank or other object of warfare, or an image-defining plate such as the plate 16 (Fig. 7) may be interposed in the path of the light rays before interruption by disc 20. The image plate 16 may be mounted in slide brackets 16a for both vertical and horizontal movement by a harmonic cam 16b working in a square (or otherwise designed) cam hole in plate 16 to cause the outline to move with a complex motion. The motor 19 may be used for this purpose with a train of gears 18 interposed. It should be understood that the size of the openings 21 and 22 is dimensioned to correspond to the size of the aperture 68c or the image-defining outline of the aeroplane, the latter being somewhat exaggerated by size in Fig. 7 for clarity.

Power driven meandering means

Figure 9:
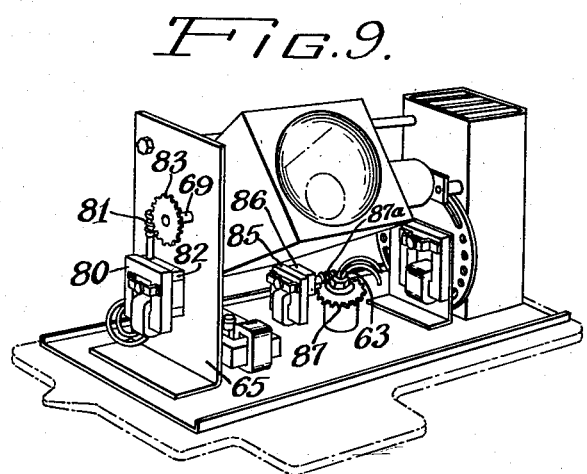
Fig. 9 is a perspective of a modified form of projector with power driven meandering means.

In Fig. 9 there is shown a modified form of the projector of Fig. 1 wherein power-driven meandering means is substituted for the manual control. To this end, there is provided a small motor 80 mounted on bracket 65 and arranged to drive a worm 81 through a speed reducer 82 to slowly drive a pinion 83 fixed on the rock shaft 69 of the lens and projector housing.

Another small motor 85 seated on the base plate is likewise provided with a speed reduction unit 86 driving a worm 87a which in turn drives a pinion 87 fixed to rotate the shaft 63. Motors 80 and 85 are connected to a special control circuit which reverses them at appropriate intervals, and also varies their speed in a scrambled manner to produce irregular meandering of the projector.

Figure 10:
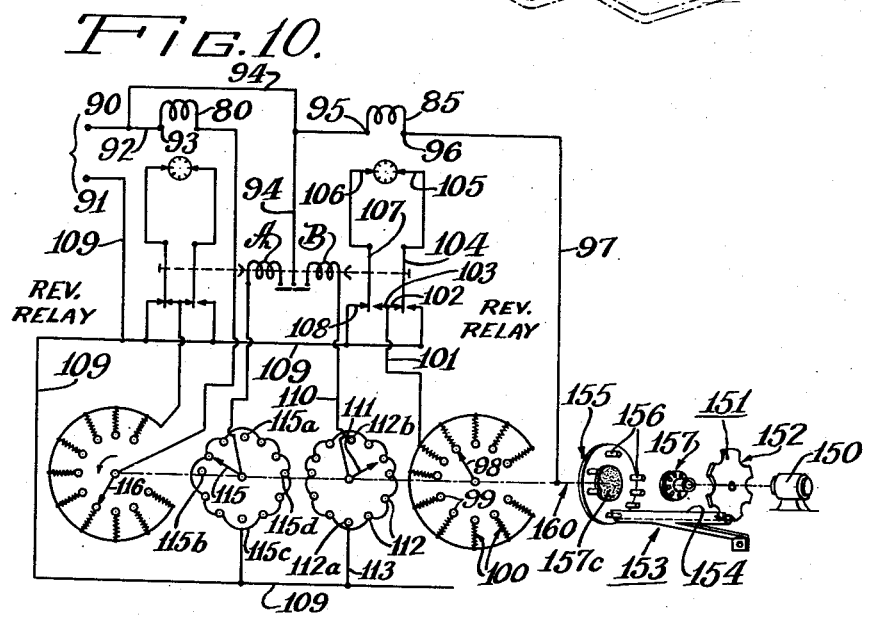
Fig. 10 is a circuit diagram for the projector of Fig. 9.

In Fig. 10 there is shown circuit means for meandering the projector, which includes the two motors 80 and 85 connected with reversing relays and commutating control switches and a scrambling device. Motors 80 and 85 are connected in the same manner to have their speeds varied by cutting in resistance, and to be reversed by reversing relays.

The illustrative arrangement of Fig. 10 provides a connection from power terminal 90 via conductor 92 to field terminal 93 of motor 80, and via conductor 94 to field terminal 95 of motor 85.

A reversing connection is effected from field terminal 96 of motor 85 via conductor 97 to a commutator switch wiper 98 adapted to successively engage contacts 99 each connected to a resistance 100. This field circuit is completed via conductor 101 to contacts 102—103 on a reversing relay having a movable contact 104 which engages normal contact 102 when the relay is dropped out. Contact 104 is connected to motor brush 105, and this circuit is completed from the other brush 106 via movable contact 107 and its normal contact 108, power lead 109 and back to power terminal 91, so that motor 85 will run in a certain direction and at varying speeds, depending on the passage of wiper contact 98 into and out of engagement with resistance contacts 99.

Motor 85 will be reversed by energization of winding B of its reverse relay from conductors 94 and 110, the latter connecting with a rotary wiper 111 adapted to engage in succession looped contacts 112 on the corresponding commutator switch and which are connected to the remaining power lead 109 by conductor 113.

Relay winding B will remain energized so long as wiper 111 engages a contact 112 connected to power lead 109, and will reverse the connections between brushes 105—106 and field coil terminal 96. By arbitrarily connecting contacts 112 in random order to the power line, the reversing relay B may be operated to cause reversals at irregular intervals thus scrambling the component of motion of the projector contributed by motor 85.

Exactly the same kind of a reversing circuit is supplied for motor 80 under control of reversing relay A, and it is therefore believed unnecessary to repeat the explanation of the duplicate circuit connections shown in Fig. 10 for motor 80.

*Scrambling control*

Means for further rendering irregular the operation of the aforesaid meandering or scrambling control for the projector includes a driving motor 150 (Fig. 10) for the several commutator switch wipers 98, 111, 115, 116, for both motors 80 and 85. This motor 150 drives a variator disc 151 having notches 152 of irregular length cut in its periphery. A springy brake arm 153 is arranged so that its offset end 154 rides on said periphery into and out of the notches thereon. (See also Fig. 11.)

In axial alignment with disc 151 is a driven member or pin disc 155 having a plurality of axially projecting pins 156 projecting from its face toward the variator disc and so arranged as to strike against the brake arm 153 when the latter is bearing as far as it can toward the variator disc by virtue of the offset 154 riding in one of the notches 152, in which position the brake arm is disposed in the path of the pins 156. As soon as the offset nose 154 of the brake arm rides out of a notch onto the normal periphery, the brake arm is sufficiently withdrawn from the path of the pins to permit the pin disc 155 to rotate freely, which it will do through the agency of a special slip clutch 57.

Figure 11:
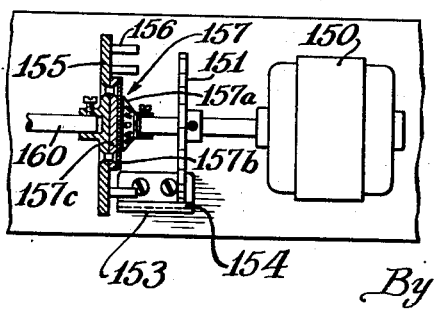
Fig. 11 is a detail of the slip clutch and scrambler drive.

Slip clutch 157, as shown in Fig. 11, consists simply of a metal spring washer or spider 157a and alternate metal and felt washers 157b, 157c, the latter being firmly pushed against the face of pin disc 155 by action of the spider washer 157a, so that the pin disc tends to be carried around with the variator disc owing to frictional drive afforded by the felt washer, although a sufficient resistance, such as blocking of pins 156 by the brake arm 153 would restrain the pin disc.

Pin disc 155 is connected by the dash-dot line 160 to drive the commutator switch wipers 98, 111, 115, 116 for varying the speed and direction of rotation of the projector motors 80 and 85, and since the notches 152 are cut irregularly in the variator disc, and pins 156 are set irregularly (with respect to circumferential spacing relative to each other) it will be apparent that pin disc 155 and hence the drive connection 160 for the commutating switches will be started and stopped in an irregular fashion, thus causing motors 80 and 85 to operate irregularly, and thus "scrambling" or rendering relatively uncertain the movements of the target image 16a, etc.

The objects and advantages of the invention may also be realized by modifications in the specific illustrative construction and arrangements disclosed herein, and it is the intention that all such modifications and equivalent arrangements shall be included in the invention as defined in the appended claims.

We claim:

1. A light projector comprising a base and means mounting the same for rotative movement about a vertical axis, and having an upright lamp housing near one side of said base, an upright trunnion plate near an opposite side of said base, a chamber having on one side thereof pivotal support on said plate and having attached to an opposite side thereof a tubular arm pivotally supported on said housing for pivotal motion about a horizontal axis through said arm, there being a light passage in the housing aligned with said horizontal axis through the tubular arm, a reflector in said chamber directing light at substantially right angles to said horizontal axis out of the chamber, said tubular arm rotating with said chamber relative to said horizontal axis.

2. A projector in accordance with claim 1 and further characterized by the provision of a motor-driven interrupter disc mounted to rotate in a plane transverse of said horizontal axis between said housing passage and tubular arm across the path of light therethrough.

3. A projector in accordance with claim 2 and further characterized by the provision of motor means geared to said pivotal mount of the chamber to pivot the chamber on said horizontal axis, motor means on said base geared to pivot the latter about said vertical axis, and a scrambling power circuit for both said motor means to impart irregular motion to said chamber and base with respect to components of both speed and direction, said circuit including power-operated automatic current-varying and switching means connected with said motor means for the purpose aforesaid.

4. In a device of the class described, scrambler means for controlling irregular circuit connections and comprising rotary switch means for changing connections in said circuit to be controlled, a motor to drive said switch rotatably, a slip clutch between said motor and switch, cam means driven by said motor on the motor drive side of said clutch, said cam means having a plurality of irregular cam dwells, brake means including a brake arm yieldingly urged into braking engagement with a brake member on the driven side of said clutch associated with said switch, and means on said brake arm riding the cam dwells on said cam, whereby the brake means is irregularly applied and released to effect irregular rotations of said switch.

5. A light projector comprising a horizontally-extensive base member having a hollow portion, and means mounting same for rotative movement about a vertical axis, an upright lamp housing mounted near one side of said base and having an open top portion and a bottom opening communicating into said hollow portion of the base, a blower including a fan rotatable about a vertical axis in said hollow portion of said base to displace air through said bottom opening and open top of the lamp housing, an upright trunnion support fixed for movement with said base opposite said housing, a chamber trunnioned by and between said support and housing to rock about a horizontal axis therebetween, there being a light passage from said housing into said chamber aligned with the rocking axis of the latter, aforesaid, and reflecting means in said chamber directing light from said housing at substantially right angles to said rocking axis outwardly of the chamber.

6. In apparatus of the class described, an optical projecting device mounted for movement with respect to both vertical and horizontal axes, separate electric motor means for moving said device with respect to both axes aforesaid, rotary switch means for varying operating currents for said motor means, and scrambling means including a motor to drive said rotary switch rotatably, a slip clutch between said motor and switch, cam means driven by said motor on the motor drive side of said clutch, said cam means having a plurality of irregular cam dwells, brake means including a brake arm yieldingly urged into braking engagement with a brake member on the driven side of said clutch associated with said switch, and means on said brake arm riding the cam dwells on said cam, whereby the brake means is irregularly applied and released to effect irregular rotations of said switch.

7. In a dirigible light projector, a hollow horizontally-extensive, upwardly-open base pan, and means mounting the same on a pedestal for rotative motion about a vertical axis; a base plate mounted over, but spaced above, the opening of said pan to substantially close the same and define a chamber interiorly of the pan with an air passage afforded around the base plate by said spacing; an upright lamp housing mounted on said base plate at one side of said vertical axis and having an air passage communicating at the lower part thereof through said base plate into said chamber, an upright member carried on said base plate on the opposite side of said axis from said housing; an optical chamber having a first pivot support on one side of said upright member and having fixed on its opposite side an elongated tube axially aligned with the axis of said pivotal support and projecting in close proximity to said lamp housing; a spacing member secured on a side of said lamp housing in spaced relation away from the latter toward the proximate end of said tube; a tubular member constituting a second pivot secured to said proximate end of the tube in axial alignment with said first pivot, and having pivotal support on said spacing member; a coaxial light passage formed through the side of said housing and the appertaining spacing member in alignment with the axis through said first and second pivots; light re-directing means in said optical chamber in optical alignment with said coaxial light passage to receive light from a lamp in said housing and redirect the same at an angle to the coaxial axis; and fan means carried by said base plate for drawing air into said base chamber and forcing same up into said lamp housing.

8. A projector construction according to claim 7 and further characterized by the provision of a motor-driven light modulating disc carried by said base plate and rotating in a plane across said coaxial light passage at a position between said spacing member and said lamp housing.

9. A construction according to claim 7 in which said fan means includes a rotatable impeller disposed beneath the base plate in said base chamber, and a driving motor therefor carried on the upper side of said base plate.

10. A construction according to claim 8 further characterized by the provision of a rocking motor mounted on said upright member and drivingly connected with said first pivot means for rocking the optical chamber; and a second or turning motor carried on the base plate and drivingly connected with said hollow base member to turn the same; together with motor driven circuit means connected with said first and second motors for concurrently varying at least the speed of both said last-mentioned motors.

11. In light-projecting apparatus, an optical projecting device mounted for movement with respect to at least two axes; separate electric motor means for moving said device respectively in each of the two axial movements thereof; variable-current control means for varying the speed of said motor means and including a motor-driven speed-change switch operating to selectively and progressively connect different current-limiting means in an operating circuit for said motor means whereby to produce a variable-speed compound motion of the optical device relative to said axes, together with intermittent-actuating means cooperable with said speed-change switch to render the operation of the latter irregular.

12. Apparatus as defined in claim 11 in which said separate motor means are reversible, and said control means includes reversing switch means connected thereby intermittently in said operating circuit whereby the motion of said optical device is varied in respect of both speed and direction of operation.

DONALD E. HOOKER.
FRANK G. NICOLAUS.

References Cited in the file of this patent

UNITED STATES PATENTS

| Number | Name | Date |
| --- | --- | --- |
| 580,836 | Hunter | Apr. 13, 1897 |
| 1,382,215 | Mordey | June 21, 1921 |
| 1,548,958 | Sperry | Aug. 11, 1925 |
| 1,598,433 | Fuog | Aug. 31, 1926 |
| 2,097,537 | Snyder | Nov. 2, 1937 |
| 2,188,829 | Clark | Jan. 30, 1940 |
| 2,194,836 | Savage | Mar. 26, 1940 |
| 2,227,007 | Schlesinger | Dec. 31, 1940 |
| 2,228,551 | Younghusband | Jan. 14, 1941 |
| 2,237,193 | Mobsby | Apr. 1, 1941 |
| 2,269,794 | Stechbart | Jan. 13, 1942 |
| 2,295,863 | Paradis | Sept. 15, 1942 |
| 2,335,257 | Binks | Nov. 30, 1943 |
| 2,344,173 | Ruge | Mar. 14, 1944 |
| 2,353,258 | Mott, Jr. | July 11, 1944 |